United States Patent
Peleshanko

(10) Patent No.: US 8,722,762 B2
(45) Date of Patent: May 13, 2014

(54) POLYURETHANE DISPERSION-CONTAINING INKJET INKS

(75) Inventor: Sergiy Peleshanko, San Diego, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 23 days.

(21) Appl. No.: 13/536,674

(22) Filed: Jun. 28, 2012

(65) Prior Publication Data

US 2014/0005330 A1     Jan. 2, 2014

(51) Int. Cl.
*C09D 11/00* (2014.01)
*C08L 83/00* (2006.01)
*C08G 18/08* (2006.01)

(52) U.S. Cl.
USPC ............... 523/160; 523/201; 524/591

(58) Field of Classification Search
None
See application file for complete search history.

(56) References Cited

U.S. PATENT DOCUMENTS

| | | | |
|---|---|---|---|
| 4,312,972 A * | 1/1982 | Khanna | 528/63 |
| 5,700,851 A | 12/1997 | Banning et al. | |
| 6,136,890 A | 10/2000 | Carlson et al. | |
| 6,858,301 B2 * | 2/2005 | Ganapathiappan | 428/407 |
| 7,478,902 B2 | 1/2009 | Prasad et al. | |
| 2004/0176498 A1 | 9/2004 | Ando et al. | |
| 2005/0004306 A1 | 1/2005 | Lubnin et al. | |
| 2009/0281240 A1 | 11/2009 | Li et al. | |
| 2010/0048765 A1 * | 2/2010 | Lubnin et al. | 523/201 |

FOREIGN PATENT DOCUMENTS

| WO | WO 2010068871 | 6/2010 |
|---|---|---|
| WO | 2011074167 | 6/2011 |

OTHER PUBLICATIONS

Extended European Search Report dated Oct. 30, 2013 for Application No. 13172806.5-1302, Applicant: Hewlett-Packard Development Company, L.P.

* cited by examiner

*Primary Examiner* — Susannah Chung
*Assistant Examiner* — Robert T Butcher

(57) ABSTRACT

The present disclosure provides inks, ink sets, and method for manufacturing inkjet inks. The inkjet ink can comprise a colorant, a liquid vehicle, and a polyurethane dispersion comprising polyurethane particles dispersed in the liquid vehicle. The polyurethane particles can have a core-shell structure with a branched inner core structure, and wherein the core comprises an amine cross-linker in an amount of 0.1 wt % to 1 wt % and the shell comprises a polyol cross-linker in an amount of 0.5 wt % to 2 wt %.

14 Claims, No Drawings

POLYURETHANE DISPERSION-CONTAINING INKJET INKS

BACKGROUND

There are several reasons that inkjet printing has become a popular way of recording images on various media surfaces, particularly paper and photo media substrates. Some of these reasons include low printer noise, and the capability of achieving high-speed recording and multicolor recording. Additionally, these advantages can be obtained at a relatively low price to consumers. With respect to inkjet ink chemistry, the majority of commercial inkjet inks are water-based. Thus, their constituents are generally water-soluble, as is the case with many dyes, or water dispersible, as is the case with pigments. Furthermore, inkjet inks often have low viscosity to accommodate high frequency jetting and firing chamber refill. However, some inks having certain positive printing characteristics with respect to inkjet architecture can have less than ideal performance on the printed page, and vice versa. Thus, ink formulations that perform well in a printer device as well as on print media continue to be sought.

DETAILED DESCRIPTION

It has been recognized that an inkjet ink can be manufactured with polyurethane dispersions that are not water soluble but maintain jettability and provide excellent durability. As such, the present inks can provide durability without sacrificing printability when printed from inkjet architecture.

In accordance with this, the present disclosure is drawn to inkjet ink compositions, ink sets, and related methods. It is noted that when discussing the present compositions, ink sets, and associated methods, each of these discussions can be considered applicable to each of these embodiments, whether or not they are explicitly discussed in the context of that embodiment. Thus, for example, in discussing a polyurethane particles for use in an inkjet ink, such polyurethane particles can also be used in the ink sets or the related methods of making polyurethane dispersions, and vice versa.

In a first example, an inkjet ink can comprise a colorant, a liquid vehicle, and a polyurethane dispersion comprising polyurethane particles dispersed in the liquid vehicle. The polyurethane particles can have a core-shell structure with a branched inner core structure, and wherein the core comprises an amine cross-linker in an amount of 0.1 wt % to 1 wt % and the shell comprises a polyol cross-linker in an amount of 0.5 wt % to 2 wt %. In one example, the branched inner core structure can be provided by a branched diisocyanate. For example, the branched diisocyanate can be a cyclic diisocyanate. In another example, the branched inner core structure can be provided by a branched diol. To illustrate, the branched diol can be a cyclic diol. In still another example, the branched inner core structure can be provided by both a branched diisocyanate and a branched diol.

Referring specifically to the polyurethane particles, in addition to the cross-linkers, this component can further comprise polymerized monomers including a polyol, a branched diisocyanate, and an acid polyol. In one example, the polyol can include a diol in a hard segment of the polymer, and another polyol in the soft segment of the polymer. Additionally, the polyurethane dispersion can have a $M_w$ from about 5,000 to 100,000 and an acid number from 8 to 15. In one example, the $M_w$ can be from about 25,000 to about 50,000 and the acid number can be from about 10 to about 13.

Generally, a polyurethane includes a hard segment (including a diisocyanate) and a soft segment. The polyurethane particles can also include a chain extender. A chain extender can be any compound capable of polymerizing with the diisocyanate such that the chain extender resides in the hard segment of the polyurethane. In one specific example, the chain extender can be any compound having a molecular weight of less than 1000 $M_w$ that resides in the hard segment that is not the diisocyanate, e.g., a diol. It is noted that the molecular weights ($M_w$) described herein refer to weight average molecule weights unless otherwise stated.

Generally, as mentioned, the present polyurethane particles include various polyols. In one example, the polyol can be present as a diol polymerized within a hard segment of the polyurethane particle. In another example, the polyol can be a diol selected from the group of: cyclic diols; 1,3-cyclohexanedimethanol; 1,4-cyclohexanedimethanol; aliphatic polycarbonate diols; polyether diols; polyethylene glycol; polypropylene glycol; polytetramethylene glycol; poly(ethylene oxide) polymers; poly(propylene oxide) polymers; poly(tetramethylene oxide) polymers; copolymers thereof having terminal hydroxyl groups derived from polyhydric compounds including diols; and combinations thereof. In one aspect, the diol can be cyclic diol. In another aspect, the diol can be an aliphatic cyclic diol. In still another aspect, the diol can be 1,4-cyclohexanedimethanol.

Additionally, the polyurethane particles include other polyols as well, such as a polyol present in a soft segment of the polyurethane. In one example, the polyol in the soft segment can be selected from the group of: cyclic diols; 1,3-cyclohexanedimethanol; 1,4-cyclohexanedimethanol; aliphatic polycarbonate diols; polyether diols; polyethylene glycol; polypropylene glycol; polytetramethylene glycol; poly(ethylene oxide) polymers; poly(propylene oxide) polymers; poly(tetramethylene oxide) polymers; copolymers thereof having terminal hydroxyl groups derived from polyhydric compounds including diols and triols; and combinations thereof. In one aspect, the polyol can be an aliphatic polycarbonate diol. In still another aspect, the polyol can be 1,6-hexanediol polycarbonate diol.

The diisocyanates used in the polyurethane particles can be selected from the group of cycloaliphatic diisocyanates, bis(4-isocyanotocyclohexyl) methane, methylene diphenyl diisocyanate, hexamethylene diisocyanate, p-tetramethyl xylene diisocyanate, m-tetramethyl xylene diisocyanate, bitolylene diisocyanate, toluene diisocyanate, methylene-bis (4-cyclohexyl)diisocyanate, p-phenylene diisocyanate, isophorone diisocyanate, 1,5-naphthalene diisocyanate, and mixtures thereof. In one aspect, the diisocyanate can be a cycloaliphatic diisocyanate.

The acid polyol can have the structure HO—$(CH_2)_n$ $(CR_1R_2)_m(CH_2)_p$—OH where $R_1$ and $R_2$ are independently H, hydroxyl, an alkyl group, or an acid group; n ranges from 0 to 20; p ranges from 0 to 20; and m ranges from 1 to 20; wherein at least one of $R_1$ and $R_2$ is an acid group. In one embodiment, the acid polyol can have from 4 to 12 carbons.

Generally, cross-linkers can be used in the core and/or the shell as discussed herein. In one example, the amine cross-linker can be an aliphatic polyamine. In another example, the polyol cross-linker can be an aliphatic polyol.

The polyurethane particles can have various concentrations of the polyols (both in the hard and soft segments), acid polyols, and diisocyantes. Generally, the diisocyante can be present in the polyurethane particles from about 10 wt % to about 70 wt %. In one embodiment, the diisocyante can be present from about 25 wt % to about 35 wt %. Generally, the polyols of the soft segment can be present in the polyurethane particles from about 20 wt % to about 80 wt %. In another embodiment, the polyols of the soft segment can be present from about 40 wt % to about 60 wt %. Generally, the acid polyol can be present in the polyurethane particles from about 1 wt % to about 40 wt %. In one aspect, the acid polyol can be present from about 10 wt % to about 15 wt %. Generally, the polyols of the hard segment, e.g., diols, can be present in the polyurethane particles from about 0.1 wt % to about 10 wt %. In further detail, diols can be present from about 1 wt % to about 3 wt %. Additionally, if the polyurethane particles are used in an inkjet ink or are further dispersed in a liquid vehicle for another reason, the polyurethane particles can be present at an amount of 1 wt % to 15 wt %, or from 5 wt % to 10 wt % of the total composition in some examples.

Generally, in an ink, if colorants are added, the colorant can be a pigment and/or dye as described herein. In one example, the colorant can be a self-dispersed pigment or pigment dispersion. The colorant can be present in the inks from about 0.1 wt % to about 10 wt %. In one aspect, the colorant can be present in an amount of 0.1 wt % to 5 wt % of the ink.

The liquid vehicle or the ink, or other composition where an liquid vehicle is added to the particles, generally comprises a solvent that provides for the polyurethane particles to be dispersed therein. The liquid vehicle can comprise one solvent or additional co-solvents. In one example, the liquid vehicle can include water. In another example, the liquid vehicle can be an aqueous liquid vehicle including a heterocyclic organic co-solvent and a diol.

The ink can also comprise a surfactant. In one example, the surfactant can be a nonionic surfactant. In another example, the surfactant can be a fluorosurfactant. Suitable surfactants that can be used include alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the inkjet inks can range from 0.01 wt % to 10 wt %.

The present inks can also include an acrylic dispersant. The acrylic dispersant can include acrylic polymers having hydrophilic monomers including acid monomers, and hydrophobic monomers. Hydrophobic monomers that can be polymerized in the acrylic dispersant include, without limitation, styrene, p-methyl styrene, methyl methacrylate, hexyl acrylate, hexyl methacrylate, butyl acrylate, butyl methacrylate, ethyl acrylate, ethyl methacrylate, propyl acrylate, propyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, ethoxylated nonyl phenol methacrylate, isobornyl methacrylate, cyclohexyl methacrylate, t-butyl methacrylate, n-octyl methacrylate, lauryl methacrylate, trydecyl methacrylate, alkoxylated tetrahydrofurfuryl acrylate, isodecyl acrylate, isobornylmethacrylate, combinations thereof, derivatives thereof, and mixtures thereof.

Acidic monomers can be present in the acrylic dispersant from at from about 0.1 wt % to about 30 wt %. Acidic monomers that can be used in the acrylic dispersant include, without limitation, acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, combinations thereof, derivatives thereof, and mixtures thereof.

Additionally, the acrylic dispersants can include reactive surfactants such as functionalized ethylene glycol acrylates, including the SIPOMER® series of surfactants from Rhodia. Other non-limiting examples of reactive surfactants include HITENOL™ (polyoxyethylene alkylphenyl ether ammonium sulfate) and NOIGEN™ (polyoxyethylene alkylphenyl ether) reactive surfactants commercially available from Dai-Ichi Kogyo Seiyaku Co., Ltd. of Japan; TREM® (sulfosuccinates) commercially available from Henkel; and the MAX-EMUL® (anionic phosphate ester) reactive surfactants commercially available from Uniqema of the Netherlands. Suitable grades of some of the materials listed above may include HITENOL BC-20, NOIZEN RN-30, TREM LT-40, and MAXEMUL 6106 and 6112.

The ink compositions of the present disclosure can also be suitable for use on many types of substrates of recording media, including but not limited to vinyl media, cellulose-based paper media, various cloth materials, polymeric materials (non-limitative examples of which include polyester white film or polyester transparent film), photopaper (non-limiting examples of which include polyethylene or polypropylene extruded on one or both sides of paper), metals, and/or mixtures or composites thereof. A non-limiting example of a suitable metal material is a metal in foil form made from, for example, at least one of aluminum, silver, tin, copper, alloys thereof, and/or mixtures thereof.

As previously discussed, the present inks can include a colorant dispersed in a liquid vehicle with a polyurethane dispersion. Typical liquid vehicle formulation described herein can include water, and optionally, one or more co-solvents present in total at from 0.1 wt % to 30 wt %, depending on the jetting or dispensing architecture, though amounts outside of this range can also be used. Further, one or more non-ionic, cationic, and/or anionic surfactant can be present, ranging from 0.01 wt % to 10 wt %. In addition to the colorant and polyurethane dispersion, the balance of the formulation can be purified water, or other vehicle components known in the art, such as biocides, viscosity modifiers, materials for pH adjustment, sequestering agents, preservatives, and the like. In one embodiment, the liquid vehicle can be predominantly water.

Classes of co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like.

Consistent with the formulation of this disclosure, various other additives may be employed to optimize the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, NUOSEPT® (Nudex, Inc.), UCARCIDE™ (Union carbide Corp.), VANCIDE® (R.T. Vanderbilt Co.), PROXEL® (ICI America), and combinations thereof.

Sequestering agents, such as EDTA (ethylene diamine tetra acetic acid), may be included to eliminate the deleterious effects of heavy metal impurities, and buffer solutions may be used to control the pH of the ink. From 0.01 wt % to 2 wt %, for example, can be used. Viscosity modifiers and buffers may also be present, as well as other additives known to those skilled in the art to modify properties of the ink as desired. Such additives, if present, can be included at from 0.01 wt % to 20 wt %.

Additionally, a method of making a polyurethane dispersion can comprise reacting an acid polyol, diisocyanate, diol, and amine cross-linker to produce a core polyurethane having inner cross-linking; and reacting the core polyurethane with a polyol and polyol cross-linker to produce a core-shell polyurethane particle having inner and outer cross-linking. Additional steps can include combining the core-shell polyurethane particle with a liquid vehicle and/or with colorant to form an ink or other liquid composition that includes the polyurethane particulates.

The monomers can be reacted sequentially or simultaneously to produce the polyurethane dispersion. Additionally, the amount of acid polyol can be stoichiometrically controlled to provide a range of acid numbers as discussed herein.

It is to be understood that this disclosure is not limited to the particular process steps and materials disclosed herein because such process steps and materials may vary somewhat. It is also to be understood that the terminology used herein is used for the purpose of describing particular embodiments only. The terms are not intended to be limiting because the scope of the present disclosure is intended to be limited only by the appended claims and equivalents thereof.

As used herein, "liquid vehicle," "vehicle," or "liquid medium" refers to the fluid in which the colorant of the present disclosure can be dispersed or dissolved to form an inkjet ink. Liquid vehicles of various types are known in the art, and a wide variety of ink vehicles may be used in accordance with embodiments of the present disclosure. Such ink vehicles may include a mixture of a variety of different agents, including without limitation, surfactants, organic solvents and co-solvents, buffers, biocides, viscosity modifiers, sequestering agents, stabilizing agents, anti-kogation agents, and water. Though not part of the liquid vehicle per se, in addition to the colorants, the liquid vehicle can carry solid additives such as polymers, latexes, UV curable materials, plasticizers, salts, etc. Additionally, the term "aqueous liquid vehicle" or "aqueous vehicle" refers to a liquid vehicle including water as a solvent.

As used herein, "co-solvent" refers to any solvent, including organic solvent and/or water, present in a liquid vehicle.

As used herein, "colorant" can include dyes and/or pigments that may be used with a liquid vehicle to form an inkjet ink in accordance with some embodiments of the present disclosure. In one embodiment, the colorant can be used to impart color to the inkjet ink.

As used herein, "pigment" generally includes pigment colorants, magnetic particles, aluminas, silicas, and/or other ceramics, organo-metallics or other opaque particles, whether or not such particulates impart color. Thus, though the present description primarily exemplifies the use of pigment colorants, the term "pigment" can be used more generally to describe not only pigment colorants, but other pigments such as organometallics, ferrites, ceramics, etc. In one specific embodiment, however, the pigment is a pigment colorant.

As used herein, "dye" refers to compounds or molecules that impart color to a vehicle or compound incorporating the dye. Generally, dyes are water soluble.

As used herein, "acid number" refers to the milligrams of potassium hydroxide required to neutralize one gram of dry polymer. The acid number of the polymer may be calculated by the formula given in the following equation: Acid number=(moles of acid in polymer)*(56 grams/mole*(1000))/(total grams of polymers), where moles of acid in polymer is the total moles of all acid group titratable that comprise the polymer, and 56 is the formula weight for potassium hydroxide.

The term "cyclic" refers to having an alicyclic or aromatic ring structure, which may or may not be substituted, and may or may not include one or more heteroatoms (nitrogen, oxygen, phosphorus, or sulfur). The term "heterocyclic" refers to a cylic compound having at least one heteroatom. Cyclic structures include monocyclic structures, bicyclic structures, and polycyclic structures. The term "alicyclic" is used to refer to an aliphatic cyclic moiety, as opposed to an aromatic cyclic moiety.

As used herein, "NCO/OH ratio" refers to ratio of the number of isocyanate (NCO) groups to hydroxyl (OH) group present in a polyurethane particle.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

EXAMPLES

The following examples illustrate a number of embodiments of the present compositions and methods that are presently known. However, it is to be understood that the following are only exemplary or illustrative of the application of the principles of the present compositions and methods. Numerous modifications and alternative compositions and methods may be devised by those skilled in the art without departing from the spirit and scope of the present systems and methods. The appended claims are intended to cover such modifications and arrangements. Thus, while the present compositions and methods have been described above with particularity, the following examples provide further detail in connection with what are presently deemed to be the acceptable embodiments.

Example 1

Polyurethane Dispersions (PUD)

Table I provides components and associated amounts for elements used in making a polyurethane dispersion.

TABLE 1

| PUD Component | Amounts (wt %) |
| --- | --- |
| Isophorone Diisocyanate | 6-10 |
| Dicyclohexylmethane 4,4'-Diisocyanate | 25-35 |
| Dimethylolpropionic Acid | 2-3 |

TABLE 1-continued

| PUD Component | Amounts (wt %) |
|---|---|
| Hydroxyl-terminated, Aliphatic Polycarbonate Diol | 50-60 |
| Cyclohexanedimethanol | 2-3 |
| 1,1,1-Tris(hydroxymethyl)propane | 1-2 |
| Diethylenetriamine | 0.1-1 |
| Ethylenediamine | 1-2 |

The present polyurethane particles can have a NCO/OH ratio ranging from 1 to 2. In one aspect, the NCO/OH ratio can be from 1.35 to 1.5.

Example 2

Inkjet Ink Compositions

Table 2 provides the ink formulations for pigmented inkjet ink compositions in accordance with embodiments of the present disclosure.

TABLE 1

| Vehicle Component | Amounts (wt %) |
|---|---|
| Heterocyclic solvent | 18-20 |
| Diol | 8-10 |
| Fluoro surfactant | 0.5-1 |
| Non-ionic surfactant | 0.1-0.5 |
| Polyurethane Dispersion From Example 1 | 5-10 |
| Biocide | 0.1-1 |
| Colorant | 1-5 |
| Water | balance |

While the disclosure has been described with reference to certain preferred embodiments, those skilled in the art will appreciate that various modifications, changes, omissions, and substitutions can be made without departing from the spirit of the disclosure. It is intended, therefore, that the invention be limited only by the scope of the following claims.

What is claimed is:

1. A polyurethane dispersion-containing inkjet ink, comprising:
   a colorant;
   a liquid vehicle; and
   a polyurethane dispersion comprising polyurethane particles dispersed in the liquid vehicle,
   wherein the polyurethane particles have a core-shell structure with a branched inner core structure, and wherein the core comprises an amine cross-linker in an amount of 0.1 wt % to 1 wt % based on the weight of the polyurethane particle and the shell comprises a polyol cross-linker in an amount of 0.5 wt % to 2 wt % based on the weight of the polyurethane particle.

2. The inkjet ink of claim 1, wherein the branched inner core structure is provided by a branched diisocyanate.

3. The inkjet ink of claim 2, wherein the branched diisocyanate comprises a cyclic group.

4. The inkjet ink of claim 1, wherein the polyurethane particles further comprise polymerized monomers including a polyol, a branched diisocyanate, and an acid polyol.

5. The inkjet ink of claim 4, wherein the polyol is present as part of a first segment and comprises a diol selected from the group consisting of: cyclic diols; 1,3-cyclohexanedimethanol; 1,4-cyclohexanedimethanol; aliphatic polycarbonate diols; polyether diols; polyethylene glycol; polypropylene glycol; polytetramethylene glycol; poly(ethylene oxide) polymers; polypropylene oxide) polymers; poly(tetramethylene oxide) polymers; copolymers thereof having terminal hydroxyl groups derived from polyhydric compounds including diols; combinations thereof, and mixtures thereof.

6. The inkjet ink of claim 4, wherein the polyol is present as part of a second segment and comprises a member selected from the group consisting of: cyclic diols; 1,3-cyclohexanedimethanol; 1,4-cyclohexanedimethanol; aliphatic polycarbonate diols; polyether diols; polyethylene glycol; polypropylene glycol; polytetramethylene glycol; poly(ethylene oxide) polymers; polypropylene oxide) polymers; poly(tetramethylene oxide) polymers; copolymers thereof having terminal hydroxyl groups derived from polyhydric compounds including diols and triols; and combinations thereof.

7. The inkjet ink of claim 4, wherein the polyol comprises a cyclic diol as part of a first segment and an aliphatic polycarbonate diol as part of a second segment.

8. The inkjet ink of claim 4, wherein the diisocyanate is selected from the group consisting of cycloaliphatic diisocyanates, bis(4-isocyanotocyclohexyl) methane, methylene diphenyl diisocyanate, hexamethylene diisocyanate, p-tetramethyl xylene diisocyanate, m-tetramethyl xylene diisocyanate, bitolylene diisocyanate, toluene diisocyanate, methylene-bis(4-cyclohexyl)diisocyanate, p-phenylene diisocyanate, isophorone diisocyanate, 1,5-naphthalene diisocyanate, and combinations thereof.

9. The inkjet ink of claim 4, wherein the diisocyanate is a cycloaliphatic diisocyanate.

10. The inkjet ink of claim 4, wherein the acid polyol has the structure HO—$(CH_2)_n(CR_1R_2)_m(CH_2)_p$—OH where $R_1$ and $R_2$ are independently H, hydroxyl, an alkyl group, or an acid group; n ranges from 0 to 20; p ranges from 0 to 20; and m ranges from 1 to 20; wherein at least one of $R_1$ and $R_2$ is an acid group.

11. The inkjet ink of claim 4, wherein the acid polyol has from 4 to 12 carbons.

12. The inkjet ink of claim 1, wherein the amine cross-linker is an aliphatic polyamine and the polyol cross-linker is an aliphatic polyol.

13. The inkjet ink of claim 1, wherein the colorant is present in an amount of 0.1 wt % to 5 wt % of the inkjet ink and the polyurethane dispersion is present in an amount of 1 wt % to 15 wt % of the inkjet ink.

14. An ink set comprising the inkjet ink of claim 1.

* * * * *

UNITED STATES PATENT AND TRADEMARK OFFICE
CERTIFICATE OF CORRECTION

PATENT NO.         : 8,722,762 B2                                         Page 1 of 1
APPLICATION NO.    : 13/536674
DATED              : May 13, 2014
INVENTOR(S)        : Sergiy Peleshanko It is certified that error appears in the above-identified patent and that said Letters Patent is hereby corrected as shown below:

In the Claims:

In column 8, line 13, in Claim 5, delete "polypropylene" and insert -- poly(propylene --, therefor.

In column 8, line 23, in Claim 6, delete "polypropylene" and insert -- poly(propylene --, therefor.

In column 8, line 31, in Claim 8, delete "of" and insert -- of: --, therefor.

Signed and Sealed this
Ninth Day of September, 2014

Michelle K. Lee
*Deputy Director of the United States Patent and Trademark Office*